April 15, 1969  A. A. NAKIB  3,438,394
TOROIDAL HEART VALVE
Filed Dec. 10, 1965  Sheet 1 of 5

INVENTOR.
AHMAD AREF NAKIB
BY
Braddock + Burd
ATTORNEYS

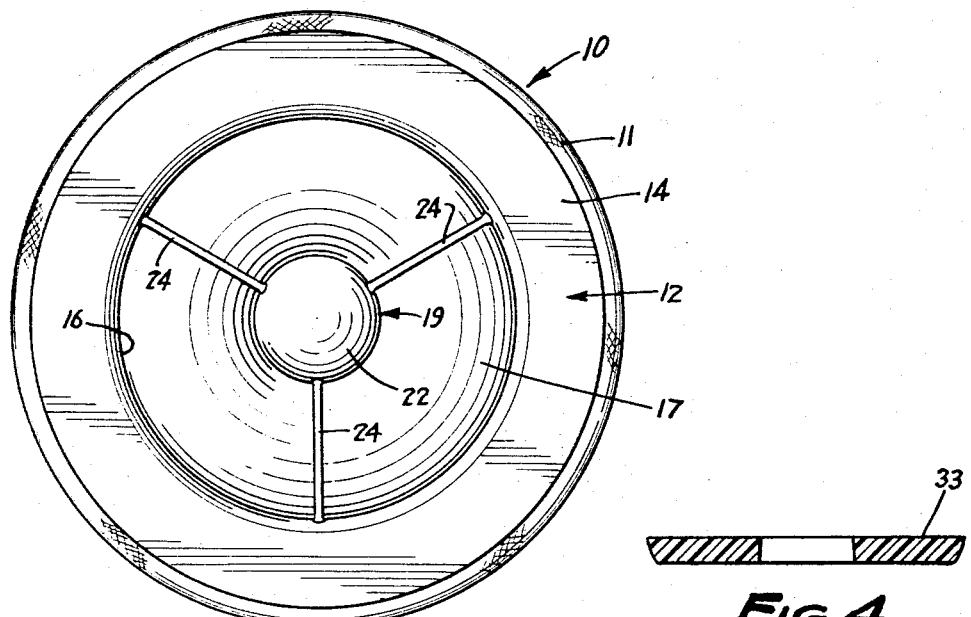
FIG. 3
FIG. 4
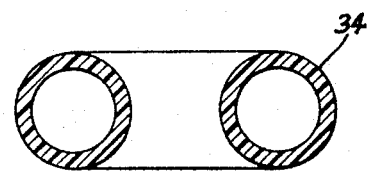
FIG. 5
FIG. 6
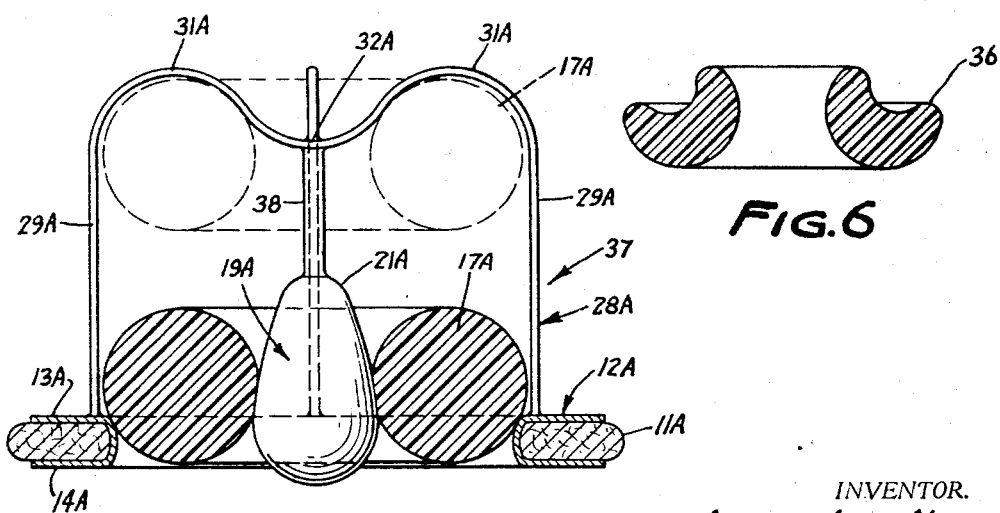
FIG. 7

INVENTOR.
AHMAD AREF NAKIB
BY
Braddock+Burd
ATTORNEYS

United States Patent Office 3,438,394
Patented Apr. 15, 1969

3,438,394
TOROIDAL HEART VALVE
Ahmad A. Nakib, Minneapolis, Minn., assignor to The Regents of the University of Minnesota, Minneapolis, Minn., a corporation of Minnesota
Filed Dec. 10, 1965, Ser. No. 512,923
Int. Cl. F16k 15/08, 15/14; A61f 1/22
U.S. Cl. 137—533.19                                 13 Claims

ABSTRACT OF THE DISCLOSURE

A toroidal heart valve having an annular base carrying a suture ring and a central circular opening. An annular valving member having a central hole moves relative to a seat on the base surrounding the opening to open and close positions. The valving member can be toroidal, funnel, semi-circular or flat in shape. Located along the axis of the opening in the base is a cone-shaped member having an outer continuous wall cooperating with the inner peripheral surface of the valving element when the outer peripheral surface of the valving element engages the seat to block the flow of fluid in one direction through the opening in the base. A plurality of circumferential spaced legs secure and position the cone-shaped member centrally in the opening in the base. A cage having a plurality of legs and inwardly turned ends aligns the valving element on the base as well as limits the open position of the valving element.

---

This invention relates to a check valve and more particularly to a valve unit having a toroidal shaped valve member movable to open and closed positions for controlling the direction of flow of fluid.

At present, several types of heart valves are available for replacement of damaged natural aortic, mitral, or tricuspid valves. These valves are one-way check valves having valving elements which move to open and closed positions to control the direction of flow of blood through the heart. In operation, the prior art valves do not substantially similate the valving action of the natural aortic or mitral valves. The valve unit of this invention obviates this disadvantage by closely simulating the flow characteristics of the natural heart valve. The valve unit is symmetrically constructed to have characteristics of wearability and durability providing for a long operative life.

Briefly described, the valve unit of this invention has a base adapted to be secured to the structure for supporting the valve unit. The base has an opening which is opened and closed by a free floating valve element located adjacent the base by open means used to limit movement of the valve element away from the base. The valve element has an inner peripheral surface defining an opening an an outer peripheral surface. When the valve element is in the closed position the outer peripheral surface engages the base. An upright member positioned along the axis of the opening through the base cooperates with the internal peripheral surface of the valve element when the valve element is in the closed position to completely seal the opening in the base. The open means is preferably a relatively short open cage which permits maximum range of movement of a toroidal valve element about equal to the radius of the opening in the base. The relative shortness in height of a toroidal valve element as compared to its width, permits the construction of a valve design with a short cage. This is crucial in the mitral position since it avoids trauma to the ventricular septum. In addition, a toroidal valve element has true central flow as well as circumferential peripheral flow providing for improved pressure efficiency and minimizing the pressure gradient on the moving fluid across the valve opening.

Figure 1:
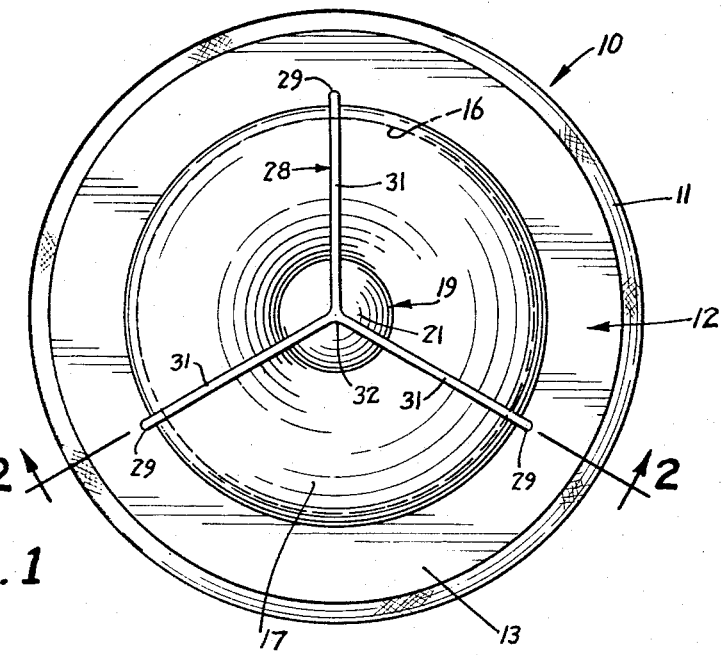
Figure 2:
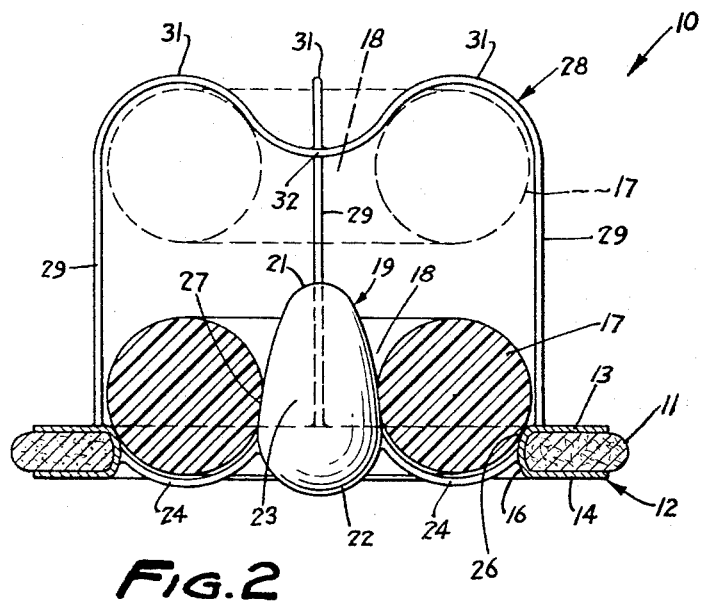
Figure 8:
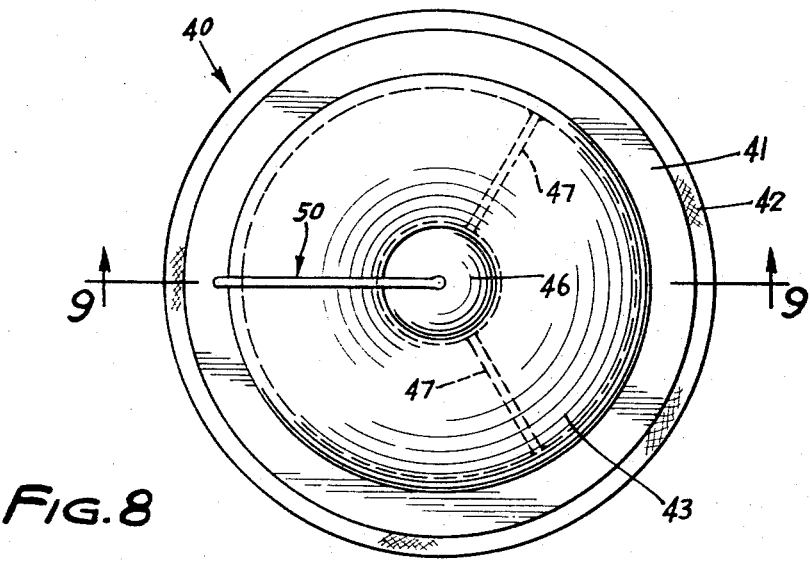
Figure 9:
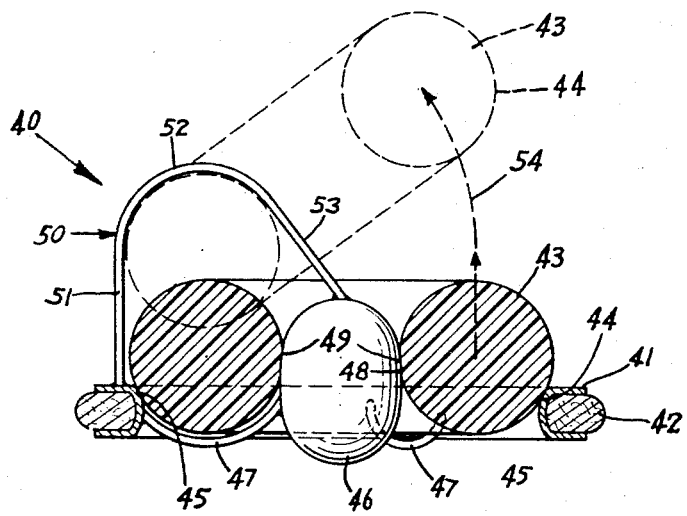
Figure 10:
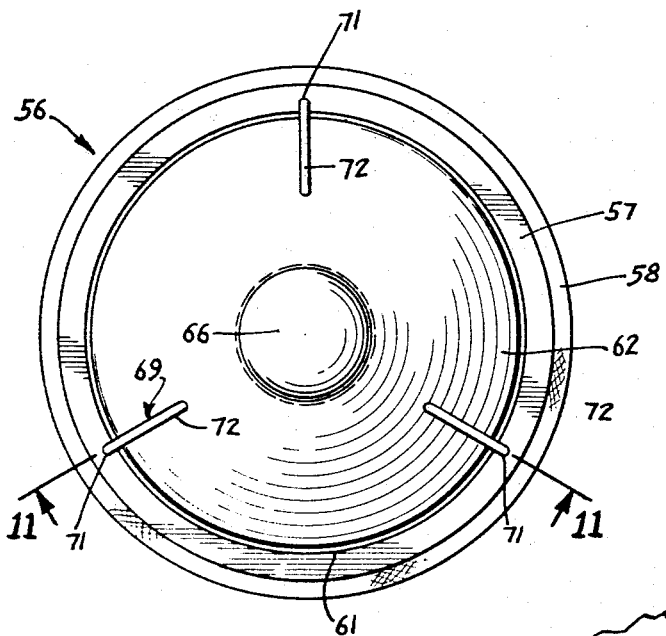
Figure 12:
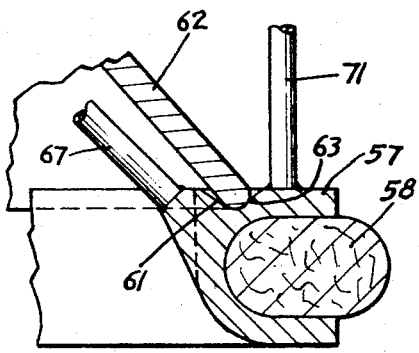
Figure 11:
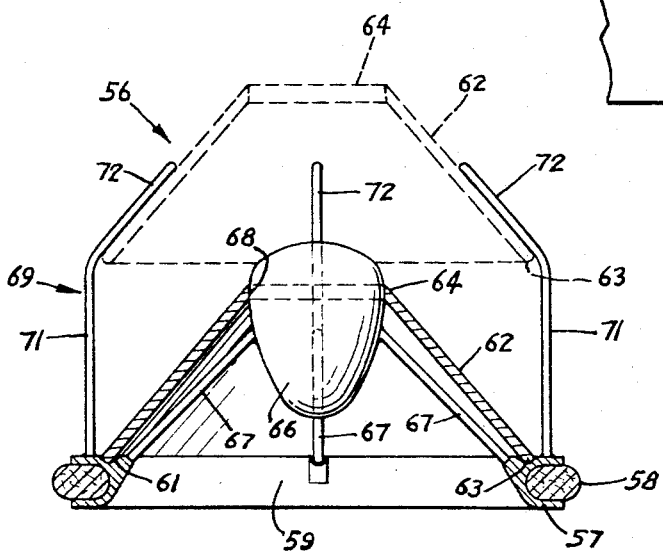
Figure 13:
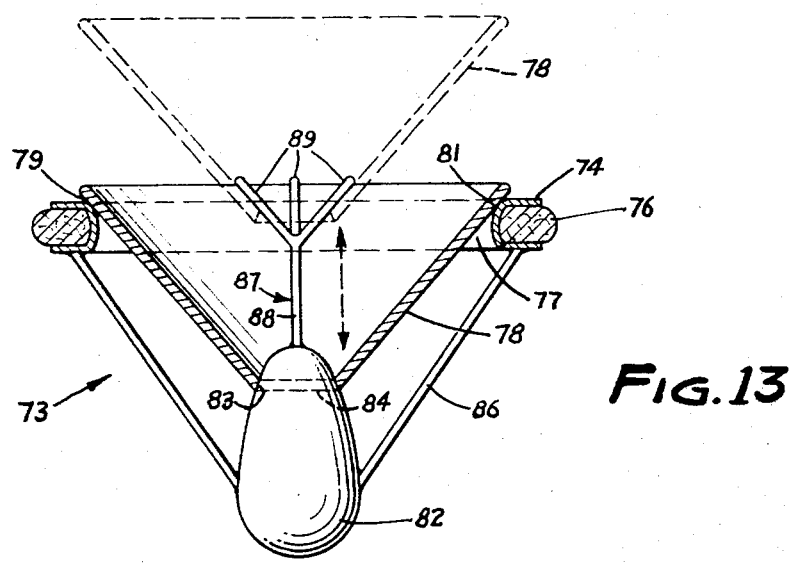
Figure 14:
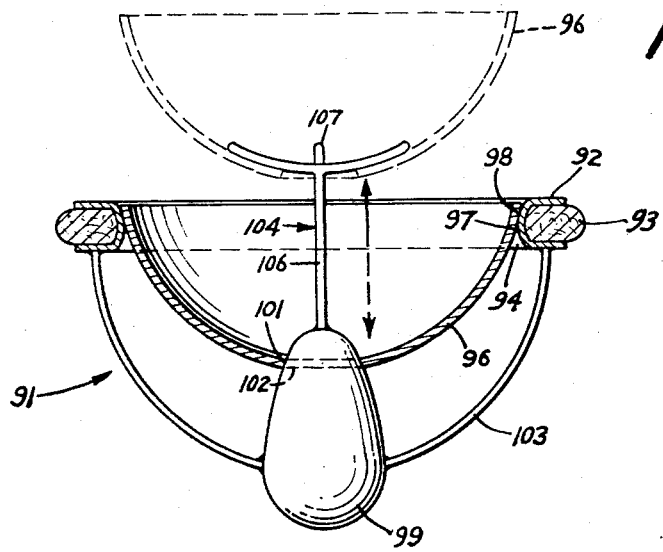

In the drawing:
FIGURE 1 is a plan view of the valve unit of this invention;
FIGURE 2 is a sectional view taken along the line 2—2 showing the toroidal valve element in full lines in the closed position and in broken lines in the open position;
FIGURE 3 is a plan view of the bottom of the valve unit of FIGURE 1;
FIGURES 4 and 5 and 6 show modifications of the cross-sectional shape of the valve elements; and
FIGURE 7 is a view similar to FIGURE 2 of a modified valve unit;
FIGURE 8 is a plan view of another modification of the valve unit;
FIGURE 9 is a sectional view taken along the line 9—9 of FIGURE 8 showing the toroidal valve element in full lines in the closed position and in broken lines in the open position;
FIGURE 10 is a plan view of still another modification of the valve unit;
FIGURE 11 is a sectional view taken along the line 11—11 of FIGURE 10 showing the frustum valve element in full lines in the closed position and in broken lines in the open position;
FIGURE 12 is an enlarged fragmentary section view showing the valve element seated on the base;
FIGURE 13 is a view similar to FIGURE 11 of a modification of the valve unit shown in FIGURES 10 and 11; and
FIGURE 14 is a view similar to FIGURE 11 of another modification of the valve unit shown in FIGURES 10 and 11.

Referring to the drawing there is shown in FIGURES 1 and 2 the valve unit of this invention indicated generally at 10 in assembled relation with an annular support ring 11 used to secure the valve unit in a fluid passage. The valve units shown in the drawing are a one-way check valve and are particularly described hereinafter as heart valves. The following description is a specific example of one application of valve unit 10 which is not intended to limit the use or application of the valve unit. The valve unit 10 can be used in other environments which require structure for controlling the direction of flow of a fluid. As a heart valve support ring 11 is a suture fixation device which may be a "Dacron" cloth collar, a woven "Teflon" ring, or any other fixation means, such as a self suturing device.

Valve unit 10 comprises a flat base indicated generally at 12 positioned about the support ring 11. Base 12 is a one-piece annular or ring shaped member having a central passage or opening and a general channel shape in radial cross section. Base 12 comprises a flat top ring 13 and a flat bottom ring 14 integral with an upright convex curved wall 16. The exterior surface of convex curved wall 16 defines the central opening. Base 12 is a rigid member such as stainless steel, plastic or the like.

The central opening is selectively opened and closed with a toroidal valve element or annulus 17 which functions as a valving element movable to open and closed positions as shown in broken and full lines in FIGURE 2 in response to pressure differences on opposite sides of the base 12. Annulus 17 has a smooth curved outer surface and a central passage 18. The annulus 17 is a one-piece member formed from plastic material which is light in weight, and resistant to wear, such as "Silastic." Annulus 17 may be made of any material, metallic or otherwise, solid or hollow.

When annulus 17 is in the closed position as shown in full lines in FIGURE 2, a cone-shaped member or conoid 19 projects through central passage 18 and is in sealing engagement with the inner peripheral surface of the annulus. Conoid 19 has a generally oblong egg shape and is made from rigid wear resistant material such as stainless steel. The top end 21 has a semi-spherical shape. The bottom end 22 has a larger semi-spherical shape. Top end 21 and bottom end 22 join with a side surface 23 which is smooth, slightly curved and tapers upwardly toward top end 21. The conoid 19 has an upright longitudinal axis coincident with the axis of the valve unit as well as the axis of the central opening in the base 12.

As shown in FIGURE 3, conoid 19 is held in the central longitudinal position with three downwardly curved radial legs 24 secured at their inner ends to circumferentially spaced portions of the conoid which lie in a plane passing through the largest diameter of the conoid. Opposite ends of the legs 24 are secured to the mid-portions of the curved wall 16.

As shown in FIGURE 2, the large semi-spherical bottom end 22 of the conoid projects slightly below the bottom plane of the base 12 and the slightly curved and upright tapered side surface 23 as well as the semi-spherical top end 21 project upwardly from the base 12. When annulus 17 is in the closed position the bottom surface of the annulus is located in the central opening spaced from the legs 24 whereby a circumferential outer peripheral surface 26 of the annulus sealingly engages the upper circumferential portion of the curved wall 16 of the base 12. This portion of wall 16 serves as a seat circumventing the opening in base 12. At the same time the inner circumferential peripheral surface 27 of the annulus 17 is in sealing engagement with a circumferential section of the tapered side surface 23 of the conoid 19. In the closed position annulus 17 is in sealing engagement with the base 12 as well as the conoid 19 and thus prevents flow of liquid downwardly through the opening in the base.

The entire annulus 17 is enclosed within an open cage indicated generally at 28 which limits the movement of the annulus between open and closed positions with respect to the opening in base 12. The height of the cage is about ¾ of the diameter of the opening in the base and limits the range of motion of annulus 17 by a distance equivalent to the radius of the opening in the base 12.

Cage 28 comprises three equally circumferentially spaced upright legs 29 having inwardly curved radial ends 31 which are joined together at an apex or center point 32. The legs 29 are smooth and stiff rod members made of stainless steel. Ends 31 each have a curvature which is slightly greater than the circular cross-section of curvature of the annulus 17. The terminal portions of the ends 31 have reverse curves positioning the apex point 32 substantially in the central transverse plane of the annulus 17 when in the open postition along the longitudinal axis of the valve unit. The lower ends of legs 29 are secured to top ring 13 of base 12. The upright legs 29 project upwardly from ring 13 and are located closely adjacent the outer peripheral sides of annulus 17 to guide the annulus in a linear path to open and closed positions.

FIGURES 4, 5 and 6 disclose modifications of the cross-sectional shape of valving element or annulus. In FIGURE 4, the annulus 33 is flat and has a generally rectangular shaped cross-section to reduce the height of the annulus to a minimum. In FIGURE 5, the annulus 34 has a tubular cross-sectional shape to provide a valving element with a minimum of weight. In FIGURE 6, the annulus 36 has a kidney shaped cross-section. The annuluses 17, 33, 34 and 36 may have shapes other than a toroid or circle, for example, the annulus may have an elliptical shape. The shape of the valving member is determined by the shape of the passage in the base as well as the shape of the center member 19.

A modified valve unit 37 is shown in FIGURE 7. The structure of valve unit 37 which is identical with the structure of valve unit 10 is indicated with the same reference numeral having a suffix A. In valve member 37 the conoid 19A is positioned longitudinally along the longitudinal axis of the valve unit by a rod 38 secured to the center of the small semi-spherical top end 21A of the conoid and secured at its opposite end to the bottom of the apex point 32A. Rod 38 is used in place of the three radial legs 24 shown in FIGURES 2 and 3. This eliminates the flow obstructions that legs 24 have to the flow of liquid through the central opening of the base 12A.

In operation, assuming that the annulus 17 is in the closed position as shown in full lines in FIGURE 2, an increase in fluid pressure on the bottom side of the valve unit forces annulus 17 in an upward direction to the open position as shown in broken lines. Upward movement of the annulus 17 is limited by the curved ends 31 of the cage 28. In the open position fluid flows upwardly through central opening in the base 12 through central opening 18 of the annulus 17 as well as circumferentially around the outside of annulus 17. This minimizes turbulence in the fluid flow and reduces the pressure gradient across the valve opening. The annulus 17 is not subjected to localized wear and fatigue because it is confined in a free floating manner within the cage 28. It freely moves between the open and closed position and can rotate around the longitudinal axis of the valve unit. The annulus 17 being constructed of a thin and light plastic material moves between the open and closed positions in response to a negligible amount of work to overcome the static inertia of the annulus.

The annulus moves from the open position to the closed position on a decrease of fluid pressure below the base 12. When fluid begins to flow in a reverse direction downwardly through the central passage of base 12 the annulus 17 quickly moves into sealing engagement with the convex curved wall 16 and the side surface 23 of the conoid 19.

Referring to FIGURES 8 and 9, there is shown a modified valve unit indicated generally at 40 for controlling the direction of flow of a fluid. Valve unit 40 has a circular base 41 formed with an outwardly opened groove accommodating a suture fixation ring 42. Base 41 has a circular opening providing a passage through the base which is opened and closed by a toroidal valve element 43. Valve element 43 is identical in structure to the toroidal valve element 17 shown in FIGURES 1 and 2. When the toroidal element 43 is in the closed position a circumferential portion of the outer peripheral surface 44 of the element engages a circumferential seat 45 on the base surrounding the opening.

Located along the longitudinal axis of the base is a conoid 46 which cooperates with valve element 43 to close the opening in the base.

Conoid 46 has a general elliptical shape and is positioned centrally of the opening in the base 41. Three circumferentially spaced downwardly curved radial legs 47 rigidly support the conoid on the base. Legs 47 are secured at their inner ends to circumferentially spaced portions of the conoid and are secured at their outer ends to the base. When the toroidal valve element 43 is in the closed position as shown in full lines in FIGURE 9 a portion of the inner peripheral surface 48 of the conoid engages the outer surface 49 of the conoid. At the same time surface 44 of valve element 43 is in sealing engagement with seat 45 thereby blocking the flow of fluid through the opening in base 41.

An increase of pressure of the fluid below base 41 raises the toroidal valve element 43 to the open position as shown in broken lines in FIGURE 9. The valve element 43 initially moves in an upright direction as indicated by arrow 54 until it strikes the top of the open means 50. It then pivots to the angular position as shown in broken lines. The open means 50 extended about a portion of valve element 43 comprises upright rod 51 secured at its lower end to the top of base 41. The top section of rod 51 is curved inwardly and joins a straight downward section 53 secured to the top of the conoid 46. The curved top 52 has a curvature substantially equal to the radius of transverse curvature of the toroidal valve element 43 so as to permit the valve element to freely rotate to the open position. When the valve element 43 is in the open position fluid flows through the opening in base 41 around the outer peripheral surface of the valve element as well as through the central opening in the valve element. Open means 50 limits movement of the valve element away from the base 41 as well as provides a stop or fulcrum about which the valve element rotates to the open position.

Referring to FIGURES 10 to 12 there is shown a further modification of the valve unit indicated generally at 56. Valve unit 56 has a circular base 57 formed with an outwardly opened groove accommodating a suture fixation ring 58. Base 57 is a ring structure defining a circular opening 59 forming a passage for the flow of fluid through the base. The top of base 57 has an upwardly open circumferential groove 61 which serves as a seat for a valve element 62 used to control the flow of fluid through the opening 59. Valve element 62 is a cone-shaped member having a generally inverted funnel-shape terminating in a lower or bottom edge 63 and a continuous top edge 64.

A conical member 66 is positioned along the longitudinal axis of the opening 59 above base 57. A plurality of upwardly and inwardly directed legs 67 are secured to circumferentially spaced portions of the conical memmember. The lower ends of the legs 67 are secured to the base 57. When the valve element 62 is in the closed position as shown in full lines in FIGURES 11 and 12 the bottom edge 63 is located in groove 61 in sealing engagement with the top of the base 57. The top edge 64 engages a circular segment 68 of the surface of the conical member 66 and thereby prevents the flow of fluid downwardly through the opening 59.

Open means 69 coacts with valve element 62 to limit movement of the valve element away from the base to define the open position of the valve element as shown in broken lines in FIGURE 11. The open means 69 comprises three circumferentially spaced upright rods 71 secured at their lower ends to the base. From the top of base 57 rods 71 project upwardly and function as guides for valve element 62. Each rod 71 has an upper end section 72 inclined inwardly at approximately the same angle as the valve element. Sections 72 are engaged by the valve element and may be viewed as stops for limiting the upward movement of the valve element.

Valve element 62 moves from the open position to the closed position in response to a reduction of pressure below base 57. On downward movement of valve element 62 the lower peripheral edge 63 is guided by the upright rods 71 into annular groove 61. At the same time the upper edge 64 moves in sealing engagement with the circumferential portion 68 of the outer surface of the conical member 66.

FIGURES 13 and 14 show modifications of the valve unit 56. Referring to FIGURE 13, there is shown a valve unit indicated generally at 73 having a circular base 74 holding a suture fixation ring 76. Base 74 has an opening 77 which is opened and closed by a free floating cone-shaped member valve element 78. When the valve element 78 is in the closed position as shown in full lines a circular outer peripheral section 79 of the large end of valve element 78 is in sealing engagement with a circumferential seat 81 on the base 74. The lower end of valve element 78 engages a conical member 82 positioned along the longitudinal axis of opening 77 below base 74. Conical member 82 has a smooth outer surface 83 on the outer portion of the member which is engaged by the lower edge 84 of the valve element. At the same time the circular section 79 is in sealing engagement with the circumferential seat 81 and thereby blocks the downward flow of fluid through opening 77. The conical member is attached to the base by three upwardly and outwardly directed legs 86.

Open means indicated generally at 87 limits movement of the valve element 78 away from the base 74. Open means 87 comprises an upright rod 88 secured to the top of conical member 82 and projected along the longitudinal axis of the opening 77. A plurality of outwardly inclined fingers 89 are attached to the upper end of the rod and serve as stops engageable with a portion of the inner surface of the valve element 78 to define the open position of the valve element as shown in broken lines.

The valve unit shown in FIGURE 14, indicated generally at 91, comprises a circular base 92 holding a suture fixation ring 93. Base 92 has a central opening 94 which is opened and closed by a free floating valve element 96. Valve element 96 has a semi-spherical shell shape with an opening in the bottom portion facing the open end of the shell. The upper outer peripheral surface 97 of valve element 96 engages a circumferential seat 98 on the base 92 when the lower end is positioned about a portion of an upright conical member 99 having an outer peripheral surface 101 engageable with the lower edge 102 of valve element 96. Conical member 99 is located below the base along the longitudinal axis of opening 94 and is supported with a plurality of curved legs 103 secured to circumferential spaced portions of the conical member 99 and the lower side of base 92.

Movement of the valve element away from the base is limited by open means indicated generally at 104. Open means 104 comprises an upright rod 106 secured to the top of the conical member 99 and extended along the axis of opening 94. Secured to the top end of rod 106 are a plurality of outwardly and upwardly curved fingers which function as stops to limit the upward movement of valve element 96.

In summary, the valve units herein described are one-way check valves which can be constructed of any suitable material, such as metal or plastic, having the characteristics of wearability and durability. The valve units have symmetrical and concentric sealing surfaces which include sealing surfaces on a free floating valve element. When the valve element is in the open position flow moves through the valve unit around the element as well as through the opening in the element. This flow of fluid is substantially uniform and non-traumatic in nature making the valve units particularly adapted to replace damaged aortic, mitral or tricuspid heart valves.

The specific embodiments described are given by way of example. It is also contemplated that the cage 28 may be angularly disposed with respect to the horizontal plane of the base 12 whereby the annulus 17 on movement between closed and open positions would hinge about one side of the annulus. Other modifications, changes in materials and variations of this invention of the valve unit may be made without departing from the spirit and the scope of the invention.

What is claimed is:

1. A heart valve for controlling the flow of blood in the heart comprising: a base having an inner peripheral surface defining an opening through the base, a generally toroidal-shaped valve element freely movable to an open position and a closed position relative to said opening in the base to control the flow of blood in one direction through the valve, said valve element having an inner peripheral surface defining an opening through the valve element and an outer peripheral surface, a generally cone-shaped member having a longitudinal axis coincident with the axis of the opening in the base and a continuous outer wall, said outer peripheral surface of the valve element cooperating with the inner peripheral surface of the base and said continuous outer wall cooperating with said inner peripheral surface of the valve element whereby the valve element is in the closed position to block the flow of blood in one direction through the opening in the base, said valve element inner and outer peripheral surfaces being spaced from the cone-shaped member and base, respectively, when the valve element is in open position, said cone-shaped member being a one piece member projected through the opening in the valve element when the valve element is in the closed position, and having a generally semi-spherical shaped bottom end and generally cone shaped top end, said bottom end being substantially larger than the top end, support means secured to the cone-shaped member for fixing the location of the cone-shaped member relative to the base, and open cage means secured to the base for limiting free floating movement of the valve element away from the base to the open position, said cage means including circumferentially spaced upright legs having inwardly directed ends engageable with the valve element when in the open position, said upright legs secured to the top of the base and located in contiguous relationship relative to the outer peripheral surface of the valve element whereby the legs guide the valve element for free floating movement between the open and closed positions.

2. The heart valve defined in claim 1 wherein said base is an annular member having at least one outwardly open peripheral groove.

3. The heart valve defined in claim 1 wherein said base has a ring-shape and is channel shaped in cross-section.

4. The heart valve defined in claim 1 wherein said support means comprise a plurality of generally radial legs secured to the base and the cone shaped member.

5. The heart valve defined in claim 1 wherein said support means comprise a rod secured to a top portion of the cone-shaped member and to the open cage means.

6. The heart valve defined in claim 1 wherein said plurality of legs have radially inwardly curved ends connected to a common apex point.

7. The heart valve defined in claim 1 wherein said open means includes a rod secured to the top portion of the cone-shaped member.

8. The heart valve of claim 1 wherein said cone-shaped member projects through the opening in the base.

9. A heart valve for controlling the flow of blood in the heart comprising: a base having an opening and seat means surrounding the opening, a generally annular valve element freely movable to an open position and a closed position relative to said opening in the base to control the flow of blood in one direction through the valve unit, said annular valve unit having an inner peripheral surface defining an opening through the valve element and an outer peripheral surface engageable with said seat means, a generally cone-shaped member having a longitudinal axis coincident with the axis of the opening in the base and a continuous outer wall cooperating with said inner peripheral surface when the outer peripheral surface of the valve element engages the seat means whereby the valve element is in the closed position to block the flow of blood in one direction through the opening in the base, said valve element in inner and outer peripheral surfaces being spaced from the cone-shaped member and base, respectively, when the valve element is in open position, support means secured to the cone-shaped member for fixing the location of the cone-shaped member relative to the base, and an open cage means for limiting free floating movement of the valve element away from the base to the open position, said open cage means having one rod member for terminating movement of the valve element away from the base, said rod member secured to the base and the top of the cone-shaped member and extending over a portion of said valve element in spaced relation thereto whereby said valve element is restrained to movement in an arcuate path between its open and closed positions.

10. The heart valve defined in claim 9 wherein said support means comprises a plurality of generally radial legs secured to the base and the cone-shaped member.

11. A heart valve for controlling the flow of blood in the heart comprising: a base having an opening and seat means surrounding the opening, a generally funnel-shaped valve element freely movable to an open position and a closed position relative to the opening in the base to control the flow of blood through the valve unit, said valve element having an inner peripheral surface at the small end defining an opening and an outer peripheral surface at the large end engageable with the seat means, a generally cone-shaped member having a longitudinal axis coincident with the axis of the opening in the base and a continuous outer wall cooperating with said inner surface when the outer peripheral surface engages the seat means whereby the valve element is in the closed position to block the flow of blood in one direction through the opening in the base, said valve element inner and outer peripheral surfaces being spaced from the cone-shaped member and seat means, respectively, when the valve element is in open position, support means secured to the cone-shaped member positioning the entire cone-shaped member axially without the plane of the base, and holding means engageable with the valve element for guiding and limiting free floating movement of the valve element away from the base to the open position, the entire outer surface of said cone-shaped member having a smooth, continuous streamlined configuration.

12. The heart valve of claim 11 wherein the holding means comprises circumferentially spaced upright legs having inwardly directed ends engageable with the valve element when in the open position, said legs secured to the top of the base and located in contiguous relationship relative to the outer peripheral surface of the valve element whereby the legs guide the valve element for free floating movement between the open and closed positions.

13. The heart valve of claim 11 wherein the holding means comprises an upright rod secured to the top of the cone-shaped member and a plurality of outwardly inclined fingers attached to the upper end of the rod, said fingers engageable with the valve element to define the open position of the valve element.

References Cited

UNITED STATES PATENTS

| | | | |
|---|---|---|---|
| 453,347 | 6/1891 | Remington et al. | 137—516.21 |
| 1,354,318 | 9/1920 | Longacre | 137—516.21 |
| 1,379,173 | 5/1921 | Decrow | 137—516.21 |
| 2,969,804 | 1/1961 | Tolkien | 137—543.19 X |
| 3,099,016 | 7/1963 | Edwards | 137—533.13 X |
| 3,191,905 | 6/1965 | Brown | 137—516.25 X |
| 3,367,364 | 2/1968 | Cruz et al. | 137—527.8 |
| 215,800 | 5/1879 | Corliss | 137—516.19 |
| 1,326,923 | 1/1920 | Frech | 137—516.17 |
| 2,275,627 | 3/1942 | Hartmann | 137—516.19 X |

FOREIGN PATENTS

| | | |
|---|---|---|
| 1,061,785 | 4/1954 | France. |
| 1,172 | 1/1887 | Great Britain. |

OTHER REFERENCES

Surgery, January 1965, vol. 57, p. 201, fig. 9, Lillehei et al.

ALAN COHAN, *Primary Examiner.*

D. H. LAMBERT, *Assistant Examiner.*

U.S. Cl. X.R.

3—1; 137—516.19